United States Patent [19]

Holzrichter et al.

[11] 3,957,709

[45] May 18, 1976

[54] WATER-SOLUBLE ESTER INTERMEDIATES AND WATER-INSOLUBLE COATINGS MADE THEREFROM

[75] Inventors: Edward J. Holzrichter, Riverside; Edward A. Lasher, Beverly Hills, both of Calif.

[73] Assignee: Whittaker Corporation, Los Angeles, Calif.

[22] Filed: Sept. 20, 1974

[21] Appl. No.: 507,746

[52] U.S. Cl. .................. 260/29.4 R; 260/67.6 R; 260/70 R; 260/71; 260/475 P; 260/485 G; 260/834; 260/835; 260/850
[51] Int. Cl.² .................. C08L 61/26; C08G 12/32
[58] Field of Search ............ 260/29.4 R, 834, 850, 260/67.6 R, 70 R, 71

[56] References Cited
UNITED STATES PATENTS 3,862,072    1/1975    Sekmakas ..................... 260/850

*Primary Examiner*—John C. Bleutge
*Attorney, Agent, or Firm*—Jay H. Quartz; Donald E. Nist

[57] ABSTRACT

Water-soluble ester intermediates characterized by having 2 and 3 ester groups per molecule are made by condensing (a) a polyol having 2 to 3 hydroxyl groups per mol and a carbon/oxygen ratio between 5:3 and 7:3 with (b) a polycarboxylic acid having a carboxyl functionality of 2 to 3, using an equivalents ratio of polyol to polycarboxylic acid so that the ester intermediate has a hydroxyl functionality of about 3 and using a ratio of 1 mol of polyol per carboxyl group.

The ester intermediates are combined in aqueous media with specific amounts of water-soluble aminoplast resin and the resulting combination is cured at elevated temperatures to produce cross-linked, water-insoluble coatings which are suitable as can and coil coatings.

Small amounts of epoxy resin which is soluble in the ester intermediate may be used to provide coatings having improved adhesion, particularly under certain adverse conditions.

10 Claims, No Drawings

WATER-SOLUBLE ESTER INTERMEDIATES AND WATER-INSOLUBLE COATINGS MADE THEREFROM

BACKGROUND OF THE INVENTION

This invention relates to water-based organic coatings and, more particularly, to such coatings which comprise the reaction product of the condensation of water-soluble, low molecular weight esters with a water-soluble aminoplast resin.

Coatings have been required for coating cans which are used, for example, as containers for soda pop and beer and for coating coiled sheet metal before it is subjected to manufacturing operations such as bending, cutting, etc. Such coatings are required to have good flexibility, hardness, durability, decorative appearance, chemical resistance and flow. Among the numerous formulations which have been used to meet these requirements (with varying degrees of success) have been organic solvent-based coatings such as those described in U.S. Pat. No. 3,714,090, issued Jan. 30, 1973, entitled "High Temperature Polyester Coating Composition" and U.S. Pat. No. 3,714,091, issued Jan. 30, 1973, entitled "Oil-Containing Polyester Coating." Although the coatings described in these patents have been highly successful, there is a present need to provide metal coatings with comparable properties which are water soluble as a preferred way of meeting clean air standards.

Water-soluble, ester-based coatings formulations are described in U.S. patent application Ser. No. 246,353, filed Apr. 21, 1972, entitled "Water-based Wood Coatings and Ester Intermediates Thereof." The coatings described therein are particularly useful as wood finishes. Although these latter coatings have many desirable properties which are required for wood coatings, they are generally too brittle and hard for metal applications unless substantially modified.

SUMMARY OF THE INVENTION

Ester intermediates having 2 to 3 ester groups per mol and having an average hydroxyl functionality of about 3 are made by condensing (a) a polyol having 2 to 3 hydroxyl groups with (b) a polycarboxylic acid having 2 to 3 carboxyl groups in an equivalents ratio such that the aforementioned ester hydroxyl functionality is produced. These ester intermediates are of low molecular weight and are water soluble. They are curable in aqueous media with water-soluble aminoplast resins to produce water-insoluble coatings which have the requisite hardness, flexibility and flow for can and coil coatings.

To provide improved adhesion to bare metal, particularly when the metal is to be subjected to hot water, such as during pasteurization of can contents, a small amount of epoxy resin is preferably included with the ester intermediate prior to condensation with the aminoplast resin.

The herein-described coatings are particularly suitable as exterior can coatings and as coil coatings and can be applied directly over cleaned, bare metal, thereby eliminating the need for a primer coat. Because the major components of these coatings are water soluble, water can be used as the sole solvent or used in combination with an amount of organic solvent which satisfies Rule 66 of the Los Angeles Air Pollution Control District, which has been adopted by a majority of air pollution control districts. This use of water reduces coatings costs and enables the coatings to meet clean air standards without resorting to the use of expensive equipment for trapping or incinerating organic solvents.

DESCRIPTION OF THE PREFERRED EMBODIMENT

As used herein, the term "water soluble", as applied to the herein-described ester intermediates, means that the latter are thinnable in water to about 50% to 90% non-volatile solids. Within this range, the water solubility of the ester intermediates will vary somewhat with the particular constituents used to make the ester intermediate and with the acid number of the latter. Small amounts of organic solvent may be used to extend the "water-solubility" of the intermediates.

The ester intermediates may be characterized by the following general structure:

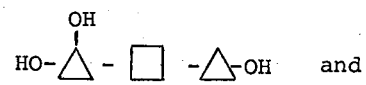 and (1)

(2)

where △ represents a polyol-derived, di- or trivalent radical and ☐ represents a polycarboxylic-acid derived, di- or trivalent radical with △ and ☐ being linked together through ester groups

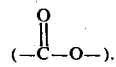

The aforementioned radicals are the polyols and polycarboxylic acids which are used herein wihout their functional groups.

From the general structures (1) and (2), it can be seen that the ester intermediates described herein are not polymeric (in contrast to polyesters). Instead, they are diesters (1) and triesters (2) of relatively low molecular weight. In fact, these ester intermediates have molecular weights on the order of 300 to 750.

The ester intermediates are the products of the condensation of specific polyols or polyol mixtures with specific polycarboxylic acids or mixtures thereof.

The polyols employed herein are aliphatic and have hydroxyl functionalities of 2 and 3. That is, both diols and triols can be used. The triols used herein are those triols having a carbon/oxygen ratio of about 5:3 to about 7:3. Triols having a lower carbon/oxygen ratio, for example, glycerine, do not provide the required flow characteristics and also produce enamels with poor gloss. Above about a carbon/oxygen ratio of about 7:3, the water solubility of the ester intermediate is adversely affected. Useful triols include trimethylolethane, trimethylolpropane and trimethylolbutane.

The diols are also aliphatic and generally have from 2 to 10 carbons. They include neopentyl glycol, ethylene glycol, diethylene glycol, triethylene glycol, tetraethylene glycol, propylene glycol, butane diols, pentane diols, and dipropylene and tripropylene glycol.

The polycarboxylic acids used herein have carboxyl functionalities of 2 and 3 and generally have from about 3 to about 10 carbon atoms. Both aliphatic and aromatic polycarboxylic acids may be used; however, it is preferred to use the latter because they lead to the production of harder coatings with the desired flexibility. Examples of useful polycarboxylic acids are: orthophthalic acid; isophthalic acid; terephthalic acid; tetrahydrophthalic and hexahydrophthalic acids; endomethylene tetrahydrophthalic acid; malonic acid; succinic acid; glutaric acid; adipic acid; suberic acid; azelaic acid; trimethyl adipic acid; trimellitic acid; trimesic acid; and sebasic acid. Anhydrides of these acids may also be used.

To prepare the ester intermediates: (a) polycarboxylic acids are condensed with the polyols in a molar ratio of about one mol of polyol per carboxyl group so that substantially all of the carboxyl groups are reacted; and (b) the polyol functionality is selected with respect to the polycarboxylic acid functionality so that the hydroxyl functionality of the ester intermediate is about 3. As to (a), if the proportion of polyol to polycarboxylic acid is significantly less than that which will provide the foregoing ratio of one mol of polyol per carboxyl group, there will be insufficient polyol available to limit the molecular size of the resulting intermediate to the molecular size range of the herein-described ester intermediates. That is, at significantly lower ratios of polyol to polycarboxylic acid than called for herein, the polyol and polycarboxylic acid reactants will polymerize. If the latter occurs, water insolubility of the intermediate can result. On the other hand, if the proportion of polyol to polycarboxylic acid is such as to provide more than about one mol of polyol per carboxyl group, the desired ester intermediate will be produced, but mixed with and trapped in it, will be undesirable amounts of free polyol. The presence of the latter leads to "smoking" during the curing of the coatings made from the ester intermediates. It can also result in crystallization of the free polyol from the uncured coatings mixture during storage.

As to (b), the polyol (diol, triol, or mixture of both) to be used is selected with respect to the polycarboxylic acid (di- or tricarboxylic acid or mixtures thereof) so that when condensation reacted together in the ratio stated at (a) above, the average hydroxyl functionality of the resulting ester will be about 3. For example, if a dicarboxylic acid is to be used, the combination of a triol and a diol can be used with it since two of the five hydroxyls of each triol/diol pair will esterify with the two carboxyl groups thereby leaving three hydroxyls on the resulting ester. On the other hand, if a tricarboxylic acid is to be used, the polyols used would be diols since the resulting esterifications would leave three unreacted hydroxyls on the ester. In summary, a polyol component comprising one or more polyols of 2 and 3 hydroxyl functionality are reacted with a polycarboxylic acid component comprising one or more polycarboxylic acids of 2 and 3 carboxyl functionality in the molar ratio of (a) above an in an equivalents ratio so that the average hydroxyl functionality of the resulting ester is about 3.

The ester intermediates described herein are cross-linked by condensation reaction with water-soluble aminoplast resins which are well known in the art. These include the condensation products of aldehydes, and particularly formaldehyde, with urea, melamine, one of the guanamines such as benzoguanamine, and dicyandiamide. Water-soluble precursors of the aminoplasts described in U.S. Pat. No. 3,691,258, issued Sept. 12, 1972, at col. 2, lines 44 – 68, and col. 3, lines 1 – 22, and incorporated herein by reference, may also be used. Preferably, water-soluble melamine-formaldehyde resins are used because more water resistant coatings can be obtained with the latter resins than with the urea-formaldehyde resins.

The weight ratio of the aminoplast resin to the ester intermediate will vary depending upon the particular aminoplast used and also upon the desired end use of the coating. For example, for melamine-formaldehyde resins, the amount of the latter will be between about 15 wt. % and about 40 wt. % of the total weight of ester intermediate and aminoplast resin whereas, for urea-formaldehyde resins, the weight of the latter will be between about 20 wt. % and about 50 wt. % of the total ester intermediate and aminoplast resin weight. Higher film hardness accompanies the higher aminoplast resin levels, but not without some sacrifice in flexibility. In any case, regardless of the particular aminoplast resin used, a sufficient amount of the latter is employed so that substantially all of the ester intermediate hydroxyls are reacted to thereby leave substantially no free hydroxyls in the coating since the latter reduce the water insolubility of the herein-described coatings.

In addition to the ester intermediate and aminoplast resin components of the coatings, epoxy resin may also be employed, particularly for applications where the coatings are placed over bare metal and are subjected to elevated temperatures. The presence of the epoxy serves to improve the adhesion of the coating. Useful epoxies are those which are soluble in the ester intermediate—at least in the amounts employed herein. Particularly useful epoxies are the low molecular weight diglycidyl ethers of bisphenol A such as those sold under the trademarks Epon 828, Araldite 6010 and DER 331.

An epoxy resin is used in amounts from 0 to about 10% by weight of the total weight of ester intermediate and aminoplast resin. Above about 10%, the water solubility of the ester is seriously affected.

To prepare the ester intermediates, the polyol and polycarboxylic acid components are reacted with each other under process conditions which are well known in the art. Preferably, the esterification reaction between these components is carried out in a reactor vessel equipped with a stirrer, heater and inert gas connections so that the reaction can be conducted in an atmosphere inert to reactants and products such as, for example, carbon dioxide, while substantially homogeneously mixing the reactor's contents. The reactants are heated to a temperature of about 460°F over a period of about 3 hours and held at approximately that temperature until the esterification is substantially complete, i.e., until substantially all of the carboxyl groups have been reacted. Completeness of the reaction can be determined by acid number tests which can be conducted on samples taken from the reactor at intervals. The esterification reaction should be continued until the acid number is less than about 20. Above this acid number, substantial quantities of free polyol remain in the reaction mixture with the adverse effect hereinbefore described. Reflux solvents such as toluene or xylene can be employed to promote the esterification reaction.

The ester intermediates are blended with the water-soluble aminoplast resins in aqueous solution which may comprise water alone or water in combination with an organic solvent such as butyl carbitol. When an epoxy is to be incorporated into the coating formulation, it is first dissolved in the ester intermediate. By that mechanism, it is brought into solution since the water-soluble ester intermediate is a solvent for the normally water-insoluble epoxy.

Curing of the ester intermediate-aminoplast resin mixture with or without the epoxy occurs at elevated temperatures and is preferably carried out in the presence of a catalyst such as para toluene sulphonic acid. Cure temperature up to about 800°F may be used. The particular cure temperature and cure time employed depends upon process line conditions. For example, can coatings may typically be subjected to a temperature of about 400°F for one minute.

Other constituents may be included in the coatings formulations as is well known. Such other constituents include pigments, flow control agents, defoaming agents, catalysts, wetting agents, lubricants and fillers.

This invention will be further described by the following examples.

EXAMPLE 1

This Example illustrates ester intermediates both within and outside the scope of this invention.

A number of ester intermediates (A – E) were each prepared according to the following procedure. In each case, the reactants (described hereinafter) together with a reflux solvent (toluol) were introduced into a reaction vessel fitted with stirrer, heater and inert gas connections. The reaction vessel was provided with a carbon dioxide atmosphere. Heating was then commenced with the temperature being raised to about 430°F over a period of about 4 hours and held at that temperature for about an additional half hour, after which the heat was shut off and carbon dioxide was again introduced into the reaction vessel to blow off the toluol. While the condensation reaction was occurring in the reaction vessel, the water produced was taken off. After the ester intermediate had cooled, water was added in sufficient amount to produce about a 90° solids aqueous solution of the ester. The acid number on the solids was about 10 – 15 in each case.

Esters A – E were made from the following amounts (as parts by weight) and types of reactants: A - 0.186 mols of each of tetraethylene glycol (tetraEG) - 35.9 parts, maleic anhydride (MA) - 18.2 parts, ethylene glycol - 11.5 parts; B - 0.281 mols of triethylene glycol (TEG) - 42.2 parts, 0.212 mols of phthalic anhydride (PA) - 31.4 parts, 0.141 mols of trimethylol ethane (TME) - 16.9 parts; C - 0.185 mols of each of TEG - 21.7 parts, PA - 27.4 parts, TME - 22.2 parts; D - 0.4 mols of TEG - 58 parts, 0.67 mols of PA - 95.4 parts, 0.89 mols of TME - 108.2 parts; and E - 0.675 mols of PA - 100 parts, and 1.35 mols of TME - 162.2 parts.

For each of the ester formulations A – E, the molar ratio of polyol to polycarboxylic acid was 2:1. The hydroxyl functionality of the ester intermediates A – E was 2, 2.67, 3, 3.4 and 4.0, respectively.

Dispersions of titanium dioxide were prepared by sand grinding 600 grams of titanium dioxide with 400 grams of each of the resin intermediates A – E (as 90% solids aqueous solutions) to produce in each case a paste. Each of the resulting pastes was blended with the following constituents and in the following amounts: 87 grams of paste; 11.4 grams of the same ester intermediate (90% solids); 11.5 grams of Cymel 303 (hexamethoxymethyl melamine); 2 grams of Igepal CO-210 (nonyl phenoxy polyoxy ethylene); 0.1 cc of a 20% by weight solution of para toluene sulphonic acid in isopropyl alcohol; 1.0 gram of 10% L-5310 (silicone resin) in butyl cellosolve; and 15 grams of water.

Each coating formulation had a pigment/binder ratio of about 0.95 and a NVM (non-volatile material content) of 84.7%.

Each coating was applied to venetian blind stock by wire wound rod draw downs and baked for 45 seconds at 400°F. The dry film properties shown in Table 1 were obtained.

TABLE 1

| | Coating Made from Ester Intermediates | | | | |
|---|---|---|---|---|---|
| | A | B | C | D | E |
| Flexibility | Pass 1-2T | Pass 2T | Pass 3T | Pass 6T | Fail 6T |
| Hardness | F-H | 2H | 3H | 4H | 5H+ |
| Boiling Water Resistance | Poor (fails 20 minutes) | Fair to Good (pass 20 minutes) | Good (pass 4 hours) | Good (pass 4 hours) | Good (pass 4 hours) |
| Ester OH Functionality | 2 | 2.67 | 3 | 3.4 | 4 |

As can be seen from Table 1, the coatings made from ester intermediates A and E, which both lie outside the hydroxyl functionality range of "about 3" which is claimed herein, exhibit properties which make them unsuitable for most metal coatings. The coating from ester A, although very flexible, is quite soft and exhibits poor water resistance. On the other hand, the coating from ester E, although exhibiting good water resistance, has very poor flexibility and is quite brittle. Additionally, as the hydroxyl functionality of the ester intermediate increases to the range of that of the coating made from ester E and above, the viscosity increases to such an extent that organic solvents are required in substantial amounts in order to provide a viscosity low enough to enable the coatings to be applied by conventional coating techniques. The coating made from ester C, which had a hydroxyl functionality of 3 and which is thus representative of the herein-described invention, exhibits very good flexibility, hardness and water resistance. The coatings made from esters B and D are representative of coatings on the borderlines of the "about 3" range claimed herein. The coating from ester B exhibits borderline water resistance, whereas the coating from ester D is characterized by relative inflexibility.

EXAMPLE 2

To a reaction vessel fitted as described in Example 1, there were added 6.1 mols of each of TEG, MA and TMP (as previously identified) together with toluol. After the vessel was provided with a carbon dioxide atmosphere, the temperature of the reactants was raised from room temperature to about 435°F over a period of about 4½ hours. After the heat was turned off, carbon dioxide was employed to remove the toluol after which water was added to the product to provide a 90% solids solution (F). The acid number on the solids was 6.6 and the minimum water tolerance was 56% NVM. The viscosity (Gardner-Holdt) of the 90% solution was X-Y.

A coating was made from the resulting ester intermediate using the following formulation: titanium dioxide (rutile) - 1200 grams; Cymel 303 - 360 grams; L-5310 silicone resin - 3.2 grams; F - 568 grams; Nopco NS (a proprietary bubble breaker) - 12 grams; B80C57-1 (50% solution of the butyl half-ester of tetrachloro phthalic anhydride in butanol) - 12 cc; and Ottawa sand - 2500 grams. This formulation had a pigment-/binder ratio of 1:1 and a NVM of 89.5. The foregoing formulation was charged to a gallon paint can which was then covered and place on a "Red Devil" paint shaker for 15 minutes, after which time the can was opened and 200 grams of water were added. The can was then returned to the shaker for 5 more minutes, after which it was removed from the shaker and the sand was allowed to settle for 10 minutes. Thereafter, the paint was decanted and strained through felt. The resulting grind had a fineness of 8+ as determined on a Hegman gauge. The paint was applied to aluminum venetian blind stock and baked at 500°F for 30 seconds. The resulting film was smooth, hard (2H - 3H), glossy (90+), and free of any discoloration and exhibited excellent adhesion to the aluminum. A panel which was placed in boiling water for one hour showed no blistering or dulling.

EXAMPLE 3

An ester intermediate was made as described in Example 2 except that the following reactants were employed: 5.24 mols of each of tetraEG and TMP and 2.62 mols of each of PA and MA (as previously identified). The resulting intermediate G was obtained and employed in 100% solids form. It had an acid number of 15 and a minimum water tolerance of 67% NVM.

A paint formulation was made up as described in Example 2 using the same constituents and amounts described therein except that 780 grams of ester intermediate G and 85 grams of water were employed in this formulation. The procedure for making the paint was the same as described in Example 2 except that 200 grams of water were added to the mixture after it had been shaken for 15 minutes.

The resulting dried film was smooth, hard (3H - 4H), glossy (90+) and free of any discoloration, and its adhesion to the metal was excellent. It survived immersion in boiling water for one hour without blistering or dulling. When catalyzed with 0.75 cc of para toluene sulphonic acid, the cured paint withstood a 4-hour boiling followed by a 30-day water soak without damage.

EXAMPLE 4

This Example illustrates the use of a polyol (glycerine) which falls outside the scope of the herein-described invention.

Using apparatus similar to that described in Example 1, the following reactants were charged to a reaction vessel: 7.1 mols of each of TEG and glycerine and 3.55 mols of each of PA and MA. The reaction vessel was provided with a nitrogen atmosphere after which heating was commenced with the temperature being raised to 460°F over a period of 5 hours. At the end of this time, heating was discontinued and the acid number of the cooled solids was determined to be 12. The resulting ester intermediate was thinned to a 90% solids solution (H) using water as the solvent.

An enamel was made up by the procedure described in Example 1 by first making a pigment dispersion. This was done by introducing 55.39 parts (by wt.) of $TiO_2$, 40.55 parts of H, 2.1 parts of epoxy resin (Epon 828) and 1.96 parts of a bubble breaker (Nalco 42519) into a sand mill which was operated until a Hegman fineness of 7.75 to 8 was obtained. To 54.93 parts (by weight) of the resulting pigment dispersion there was added: 16.23 parts of H, 0.32 parts of Epon 828, 3.25 parts of Igepal CO-210, 10.69 parts of Cymel 300W, 2.21 parts of 10% carnauba wax dispersion (in 2-butoxy ethanol), 1.53 parts of 10% L5310 silicone resin (in butyl carbitol), 1.85 parts of butyl carbitol, 8.66 parts of distilled water, 0.27 parts of catalyst 1010 (20% by weight of para toluene sulphonic acid in isopropanol) and 0.06 parts of amino methyl propanol (2-AMP). This coating formulation had a pigment/binder ratio of 0.61:1.

This coating formulation was coated on aluminum and cured for 45 seconds at 500°F to produce a dry film thickness of 0.5 mils. The cured coating had a hazy, smokey appearance and a gloss of less than 50 as measured on a 60° meter. For purposes of comparison, acceptable gloss for glossy coatings is usually on the order of 85 or better measured on a 60° meter and has a clear, shiny appearance.

EXAMPLE 5

An ester intermediate was made as described in Example 1 using 3.9 mols of trimellitic anhydride and 11.7 mols of TEG. The resulting ester intermediate was thinned to 90% solids solution (K) and had an acid number on the solids of 18.

An enamel was made from the ester intermediate solution K exactly as described in Example 4. The paint formulation so made was cured as described in Example 4. The cured coating exhibited good gloss, hardness, flexibility and water resistance.

As used in the claims, the terms "polyol" and "polycarboxylic acid" mean both individual polyols and polycarboxylic acids as well as mixtures thereof.

We claim:
1. A method of making a water-based coatings composition comprising the steps of:
   admixing an amount of (a) an aliphatic polyol having a hydroxyl functionality of 2 to 3 with an amount of (b) a polycarboxylic acid having a carboxyl functionality of 2 to 3 to provide a molar ratio of said (a) to said (b) of one mol of said (a) per carboxyl group of said (b) and an equivalents ratio of said (a) to said (b) so that said ester intermediate has a hydroxyl functionality of about 3, said polyol hav- ing a hydroxyl functionality of 3 also having a carbon/oxygen ratio between about 5:3 and 7:3;

heating the admixture of said (a) and (b) to esterify said (a) and (b);

continuing said heating until an acid number below about 20 is obtained to produce a water-soluble ester intermediate;

admixing said ester intermediate with an amount of a water-soluble aminoplast resin sufficient to produce a substantially water-insoluble cured coating and with a solvent for said ester resin and said aminoplast resin with water comprising at least a substantial portion of said solvent, to produce a heat-curable solution; and dissolving an epoxy resin in said ester intermediate before esterification of said ester intermediate with said aminoplast resin, with said epoxy resin comprising up to about 10% by weight of the total weight of said ester intermediate and said aminoplast resin.

2. The method of claim 1 wherein said polyol has from 2 to 10 carbons.

3. The method of claim 2 wherein said polycarboxylic acid has from 3 to about 10 carbons.

4. The method of claim 1 wherein said polyol is selected from the group consisting of ethylene glycol, neopentyl glycol, diethylene glycol, triethylene glycol, tetraethylene glycol, propylene glycol, butane diols, pentane diols, and dipropylene and tripropylene glycol.

5. The method of claim 4 wherein said polycarboxylic acid is selected from the group consisting of orthophthalic acid, isophthalic acid, terephthalic acid, tetrahydrophthalic and hexahydrophthalic acids, endomethylene tetrahydrophthalic acid, malonic acid, succinic acid, glutaric acid, adipic acid, suberic acid, azelaic acid, trimethyl adipic acid, trimellitic acid, trimesic acid, and sebasic acid.

6. The method of claim 1 wherein said heat-curable solution is coated on a surface and heated to cure the mixture of said ester intermediate, epoxy resin and aminoplast resin to produce said substantially water-insoluble coating.

7. The method of claim 1 wherein said epoxy resin is a low molecular weight diglycidyl ether of bisphenol A.

8. A method of making a waterbased coatings composition comprising the steps of:

admixing a reflux solvent with an amount of (a) an aliphatic polyol having from 2 to 10 carbon atoms and a hydroxyl functionality of 2 to 3 with an amount of (b) a polycarboxylic acid having from 3 to 10 carbon atoms and a carboxyl functionality of 2 to 3 to provide a molar ratio of said (a) to said (b) of one mol of said (a) per carboxyl group of said (b) and an equivalents ratio of said (a) to said (b) so that said ester intermediate has a hydroxyl functionality of about 3, said polyol having a hydroxyl functionality of 3 also having a carbon/oxygen ratio between about 5:3 and 7:3;

heating the admixture of said (a) and (b) to esterify said (a) and (b);

continuing said heating until an acid number below about 20 is obtained to produce a water-soluble ester intermediate;

admixing said ester intermediate with (1) an amount of a water-soluble aminoplast resin sufficient to ensure reaction of said aminoplast resin with substantially all of the hydroxyl groups of said ester intermediate to produce a substantially water-insoluble cured coating and with (2) a solvent for said ester resin and said aminoplst resin with water comprising at least a major portion of said solvent, to produce a heat-curable solution; and dissolving an epoxy resin in said ester intermediate before esterification of said ester intermediate with said aminoplast resin, with said epoxy resin comprising up to about 10% by weight of the total weight of said ester intermediate and said aminoplast resin.

9. The method of claim 8 wherein said heat-curable solution is coated on a surface and heated to cure the mixture of said ester intermediate, epoxy resin and aminoplast resin to produce said substantially water-insoluble coating.

10. The method of claim 8 wherein said epoxy resin is a low molecular weight diglycidyl ether of bisphenol A.

* * * * *

UNITED STATES PATENT AND TRADEMARK OFFICE
CERTIFICATE OF CORRECTION

PATENT NO. : 3,957,709
DATED : May 18, 1976
INVENTOR(S) : Edward J. Holzrichter and Edward A. Lasher It is certified that error appears in the above–identified patent and that said Letters Patent are hereby corrected as shown below:

In the claims, column 9, line 16 and column 10, line 31, "esterification" should read --etherification--.

Signed and Sealed this

Fourteenth Day of September 1976

[SEAL]

Attest:

RUTH C. MASON
Attesting Officer

C. MARSHALL DANN
Commissioner of Patents and Trademarks